Nov. 29, 1927.

V. BENDIX 1,650,816

BRAKE APPLYING MEANS

Filed Feb. 21, 1927

INVENTOR
VINCENT BENDIX
BY
*M. W. McConkey*
ATTORNEY

Patented Nov. 29, 1927.

1,650,816

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

BRAKE-APPLYING MEANS.

Application filed February 21, 1927. Serial No. 169,990.

This invention relates to brakes, and is illustrated as embodied in novel operating means for an internal expanding automobile brake.

An important feature of the invention relates to forming a very accurate cam, at a low cost, by building it up from plates or stampings of metal which is thin enough, and of sufficiently high grade, so that it may be stamped out with exceedingly great accuracy. While a laminated cam of this character is of as great accuracy as a profiled or machined cam made from a forging, it can be made (in large quantities) at an extremely low cost.

In the embodiments shown, where the cam is intended to operate on spaced rollers at the end of a brake shoe, a central spacer section (which need not be so accurate) may be formed of thicker and cheaper plates or stampings, preferably of larger size than the cam stampings proper so that they project as a central rib which extends between the rollers to position the end of the shoe laterally.

Other features of novelty relate to securing the cam to a flange on the end of the camshaft, which is preferably a hollow tube flared at its end to form the flange, and to a novel arrangement of anti-friction rollers for the shaft, and to other novel combinations of parts and desirable particular constructions which will be apparent from the following description of the illustrative embodiments shown in the accompanying drawing, in which.

Figure 1:
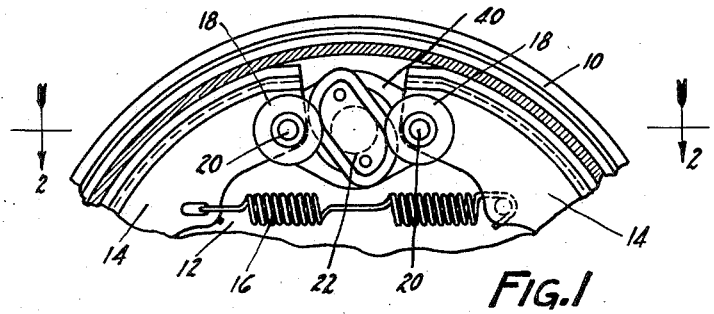
Figure 1 is a partial vertical section through the upper part of the brake, just inside the head of the brake drum, showing the novel cam and the ends of the brake shoes in side elevation.

Each of the illustrated brakes includes a rotatable drum 10, at the open side of which is a stationary support such as a backing plate 12, and within which are the shoes 14 or other equivalents, which are applied against the resistance of a return spring 16. At the end of each shoe 14, cam-engaging rollers 18 are mounted on a pivot 20 near the end of the stiffening web of the shoe, the rollers projecting a short distance beyond the end of the web.

Figure 3:
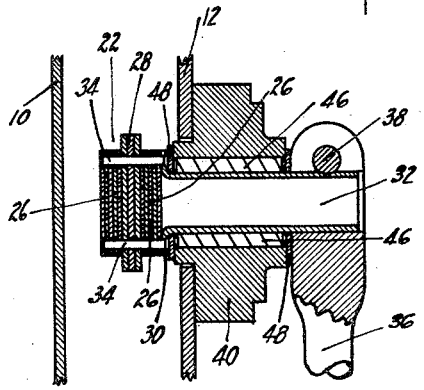
Figure 3 is a partial vertical section through the brake-applying means, on the line 3—3 of Figure 2.
Figure 4:
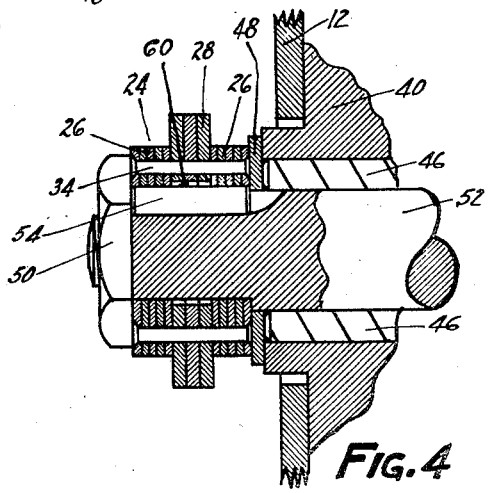
Figure 4 is a view corresponding to Figure 3, but on a larger scale and showing a modified construction suitable for a heavy truck brake.

According to an imporant feature of the present invention, rollers 18 or their equivalents are acted on by a novel laminated cam 22 (Figures 1–3) or 24 (Figure 4). Preferably the end sections of this cam, which engage the rollers 18, are built up of relatively-thin flat plates or stampings 26, which may be stamped with great accuracy on account of their extreme thinness, and which are preferably of relatively high-grade material such as a high-carbon steel. The central section, which projects between rollers 18 to positon the shoe ends laterally, need not be so accurate, and is accordingly built up of thicker plates or stampings 28 of cheaper material, these stampings being somewhat larger than stampings 26 so that they project to form a central rib projecting between rollers 18. Stampings 28 may be regarded as a spacer section separating the two end sections built up from stampings 26.

Figure 2:
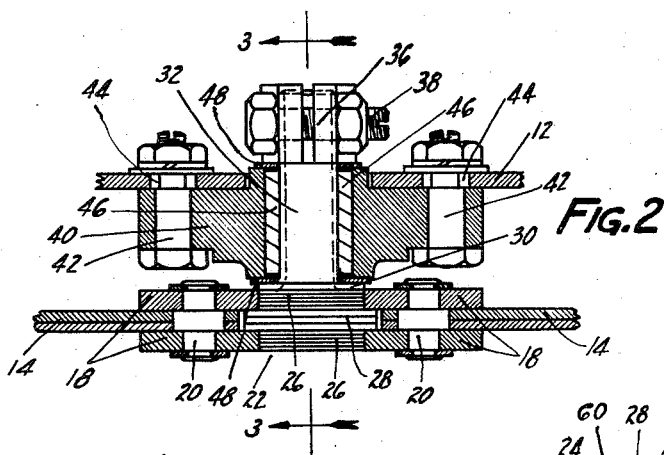
Figure 2 is a partial horizontal section through the brake-applying means, on the line 2—2 of Figure 1.

In the arrangement of Figures 1–3, the novel laminated cam 22 is permanently assembled, and permanently secured to a flange 30 of the same contour as the stampings 26 and which is formed by flaring outwardly the end of a novel tubular or hollow shaft 32, by spot-welding and preferably additionally by rivets 34. An operating arm 36, having its upper end slotted, is clamped or contracted upon the opposite end of shaft 32 by means such as a clamping bolt 38. Arm 36 may be formed to close the end of shaft 32 opposite the cam 22.

The shaft 32 is shown as passing through a bearing opening in a bracket or support 40 adjustably secured to the backing plate 12 by bolts 42 passing through slots 44.

According to an important minor feature of the invention, shaft 32 is journalled in a bearing formed by a series of anti-friction rollers 46 in the bearing opening in bracket 40, the rollers 46 being held against endwise movement in one direction by the cam 22 (or 24), or by flange 30 which forms a part of the cam and in the other direction by the arm 36. If desired, thrust washers 48 may be arranged at the ends of rollers 46.

The cam 24 of Figure 4, which is intended more especially to be secured by a nut 50 on the end of a heavy forged shaft 52 for use in a heavy truck brake, is built up of stampings 26 and 28 as described above, except that the stampings are formed with registering openings for the shaft 52, and with alined notches forming a keyway for a key 54 through which the cam is driven from the shaft. Since there is very little torque transmitted to stampings 26 through the stampings 28, I prefer to avoid the necessity for unnecessary accuracy in stampings 28 by making the openings for shaft 52, and the notches for key 54, a few thousandths of an inch larger than the corresponding openings and notches in the stampings 26, thus providing a clearance 60.

While two illustrative embodiments have been described in detail, it is not my intention to limit the scope of the invention to those particular embodiments, or otherwise than by the terms of the appended claims.

I claim:

1. A brake-applying device comprising, in combination, a central section of several relatively-thick flat cam-contoured plates, and sections on opposite sides of the central section each consisting of several relatively-thin flat cam-contoured plates somewhat smaller than the plates of the central section, all of the plates being secured together to form a laminated cam having a central rib.

2. A brake-applying device comprising, in combination, a central section of flat cam-contoured plates, and sections on opposite sides of the central section each consisting of flat cam-contoured plates somewhat smaller than the plates of the central section, all of the plates being secured together to form a laminated cam having a central rib.

3. A laminated cam built up of a plurality of flat plates of different sizes secured together to form a cam having a rib projecting from its center.

4. A laminated cam built up of accurately-contoured plates stamped from thin and hard material and spacer plates stamped from thicker and cheaper material.

5. A laminated brake-applying cam having a positioning rib projecting about its center.

6. A laminated brake-applying cam comprising, in combination, a plurality of plates having the contour of the cam, and means for securing the plates together.

7. A laminated brake-applying cam comprising, in combination, a plurality of flat and thin stamped plates having the contour of the cam, and means for securing the plates together.

8. A brake-applying device comprising, in combination, a tubular shaft flared outwardly at one end to form a flange in a plane at right angles to the axis of the shaft, and a cam secured to said flange and closing the end of the shaft.

9. A brake-applying device comprising, in combination, a tubular shaft flared outwardly at one end to form a flange in a plane at right angles to the axis of the shaft, and a plurality of thin plates secured to each other and to said flange and so shaped as to form a cam attached to the end of the shaft.

10. A brake-applying device comprising, in combination, a shaft having at one end a flange in a plane at right angles to the axis of the shaft, and a cam secured to said flange.

11. A brake-applying device comprising, in combination, a shaft having at one end a flange in a plane at right angles to the axis of the shaft, and a plurality of thin plates secured to each other and to said flange and so shaped as to form a cam attached to the end of the shaft.

12. A laminated brake-applying cam having the cam contour extending around the edges of the respective laminations.

13. A brake-applying device comprising, in combination, a bracket formed with a bearing opening, a brake-applying member having a shaft passing through said opening, an operating arm on the end of the shaft opposite said member, and anti-friction rollers arranged about the shaft in said opening and held against endwise movement in one direction by said member and in the other direction by the arm.

14. A brake-applying device comprising, in combination, a bracket formed with a bearing opening, a brake-applying cam having a shaft passing through said opening, an operating arm on the end of the shaft opposite said cam, and anti-friction rollers arranged about the shaft in said opening and held against endwise movement in one direction by said cam and in the other direction by the arm.

In testimony whereof, I have hereunto signed my name.

VINCENT BENDIX.